Figure 1:
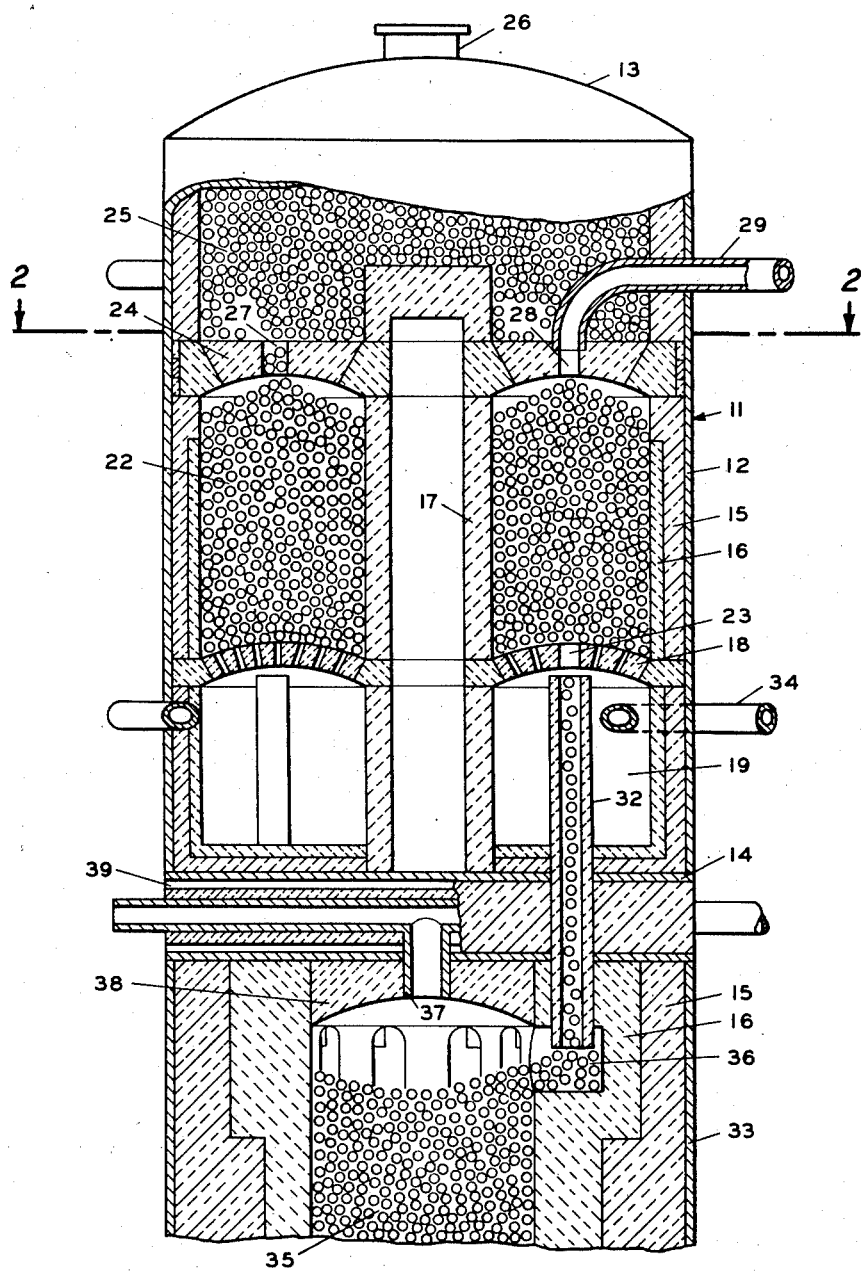

Jan. 2, 1951     R. R. GOINS     2,536,436
PEBBLE HEATING CHAMBER

Filed Jan. 5, 1948     4 Sheets—Sheet 1

INVENTOR.
R. R. GOINS
BY
ATTORNEYS

Jan. 2, 1951     R. R. GOINS     2,536,436
PEBBLE HEATING CHAMBER

Filed Jan. 5, 1948     4 Sheets-Sheet 2

INVENTOR.
R.R. GOINS
BY *Hudson and Young*
ATTORNEYS

INVENTOR.
R. R. GOINS
BY Hudson and Young
ATTORNEYS

Patented Jan. 2, 1951

2,536,436

UNITED STATES PATENT OFFICE 2,536,436

PEBBLE HEATING CHAMBER

Robert R. Goins, Bartlesville, Okla., assignor to Phillips Petroleum Company, a corporation of Delaware Application January 5, 1948, Serial No. 558

13 Claims. (Cl. 263—19)

This invention relates to pebble heater apparatus. In one of its more specific aspects, it relates to improved pebble heating or regeneration chambers of pebble heater apparatus. In another of its more specific aspects, it relates to a method of regulating pebble flow through pebble heater apparatus.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous exchange material. The solid heat exchange material is heated to a high temperature in the heat exchange and is then passed to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at its lower periphery and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed. One disadvantage of conventional pebble heater chambers is that it is most difficult to establish uniform flow of uniformly heated solid heat exchange material from the pebble heating chamber to the gas heating chamber. In the withdrawal of solid heat exchange material from a substantially central point in the bottom of the pebble heating chamber, the moving solid heat exchange material tends to form a cone. That material which is below and outside of the cone remains in what is substantially a stagnant area. At the same time when solid heat exchange material is introduced centrally into the upper portion of the pebble heating chamber the top of the solid heat exchange material forms an inverted cone extending downwardly and outwardly from the material inlet in the top of the chamber. It will thus be seen that that portion of the solid heat exchange material which moves through the bed is bounded by a cylindrical periphery and capped top and bottom by oppositely extending cones. The hot gaseous heat exchange material which is introduced at the bottom of the solid material bed seeks a path of least resistance upwardly through the solid material. Inasmuch as the bed is thinner at its outer periphery than at its axis, the gas tends to channel through that material making up the periphery of the solid material bed, thus imparting heat to the material at the periphery while failing to raise the central portion of the solid material bed to the same temperature. The solid material which comes to rest in the stagnant areas, once raised to the temperature of the hot gaseous heat exchange material, fails to thereafter enter substantially into heat exchange relation with the hot gaseous material. It will thus be seen that the hot gaseous materials pass through an even thinner layer of solid material which will enter into a heat exchange relation therewith. For the reasons above described, large amounts of heat are lost by escape of the gaseous heat exchange material from the pebble heating chamber without its having imparted a maximum of its heat to the solid material bed.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are substantially spherical in shape, and range from about $\frac{1}{8}$ to about 1 inch in diameter. In a high temperature process, pebbles having a diameter of between about $\frac{1}{4}$ and $\frac{3}{8}$ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials when properly fired serve very well in high temperatures, some withstanding temperatures up to about 3500° F. Pebbles which are used may be either inert or catalytic as used in any selected process.

An object of the invention is to provide improved means for heating pebbles in pebble heater apparatus. Another object is to provide an improved method of flowing pebbles through a pebble heater chamber. Another object is to provide improved means for more evenly heating pebbles in pebble heater chambers. Another object is to provide an improved method for heating pebbles in pebble heater apparatus. Other and further objects and advantages will be apparent upon study of the accompanying discussion, the drawings and the claims.

Figure 2:
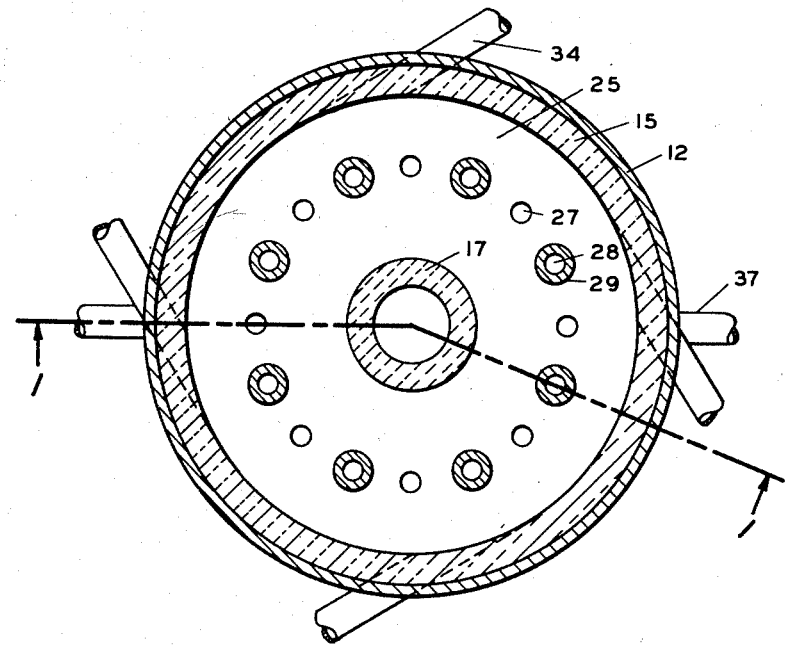
Figure 5:
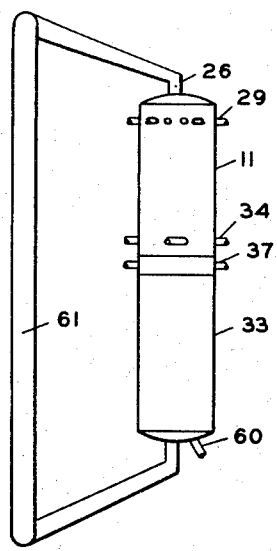
Figure 3:
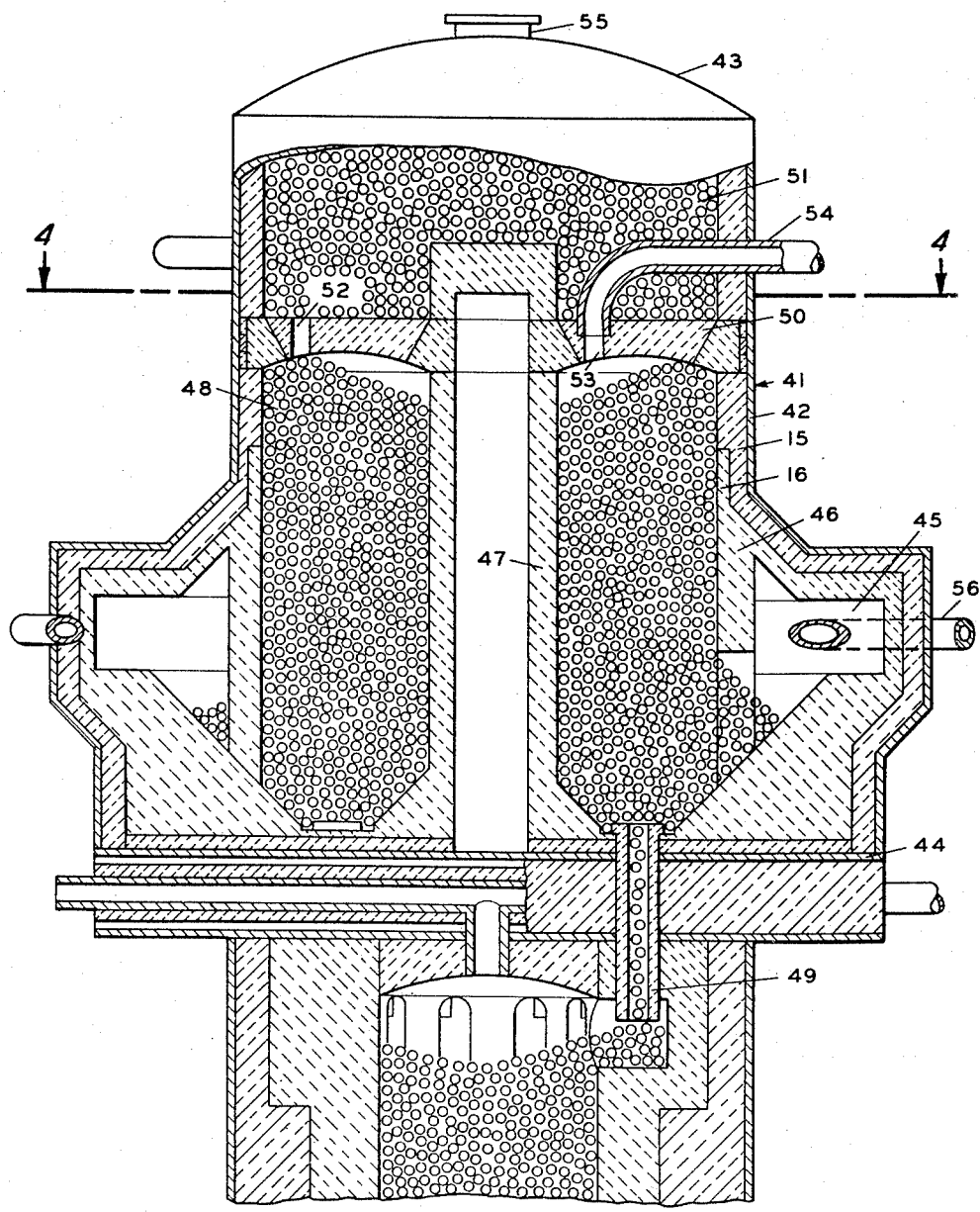
Figure 4:
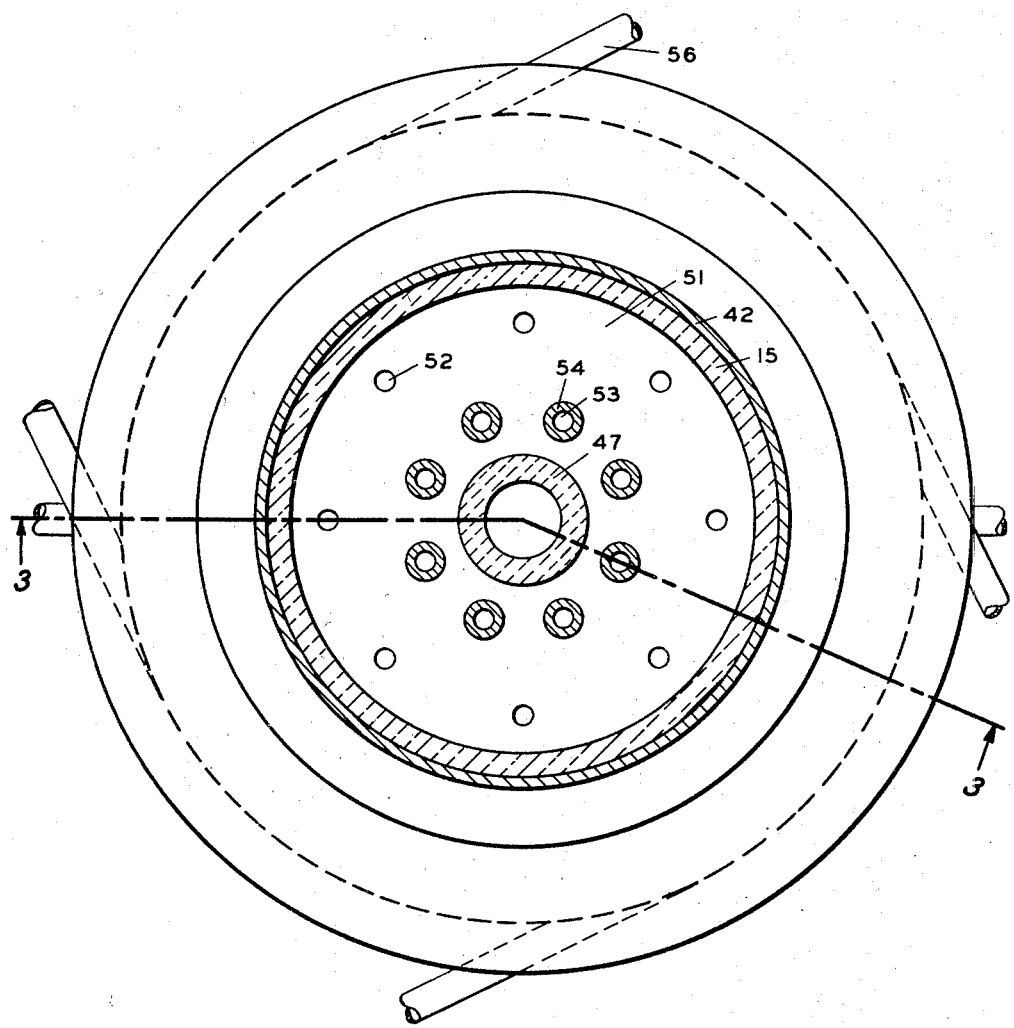

Understanding of the invention will be facilitated upon reference to the diagrammatic drawings in which Figure 1 is a vertical section of a pebble heater chamber and the upper portion of a gas heating chamber embodying the invention, taken along the line 1—1 of Figure 2. Figure 2 is a horizontal section taken along the line 2—2 of Figure 1. Figure 3 is a vertical section of a pebble heater chamber and the upper portion of a gas heating chamber, embodying a modification of the invention, taken along the line 3—3 of Figure 4. Figure 4 is a horizontal section taken along the line 4—4 of Figure 3. Figure 5 is a schematic view of a pebble heater apparatus.

In Figure 1, pebble heating chamber 11 comprises a substantially vertically disposed shell 12 which is closed at its upper end by closure member 13 and at its lower end by refractory and insulation lined closure member 14. The walls of shell 12 are lined with insulating means including common refractory material 15 and super-refractory material 16 backed by common refractory material 15 or other insulation backing material. Core 17 extends substantially coaxially upwardly into shell 12 from its bottom and forms an annular space between said core and said lined shell. Core 17 is preferably formed of a refractory material such as common refractory 15 and/or super-refractory material 16 and may either be hollow as shown in Figure 1 or may be solid. Common refractory materials may include block insulation, insulating fire brick and fire clay brick. Super-refractory materials may include silicon carbide, mullite, alumina, or any other suitable refractory having physical and chemical properties which give it sufficient strength to withstand a reasonably heavy load and a high temperature without substantial breakage or deterioration. Silicon carbide may be satisfactorily used in operations utilizing temperatures up to about 3000° F. Mullite can also be satisfactorily used at temperatures up to about 3000° F. while alumina may be satisfactorily used at temperatures up to about 3300° F. These materials may be used at those temperatures without substantial oxidation or reaction with most conventionally used pebbles. Core 17 is considerably smaller in outer diameter than the inner diameter of the lining forming the shell interior. Annular refractory arch 18 is provided within the annular space formed between core 17 and shell 12 and is preferably disposed in the lower portion of that annular space so as to close off annular combustion zone 19 below the arch from pebble heating zone 22 above the arch. Arch 18 is perforate so as to allow the passage of hot gases from the combustion zone upwardly therethrough into the pebble heating zone. A plurality of pebble outlets 23 is provided around the refractory arch 18. There are preferably eight such pebble outlets evenly disposed centrally about arch 18. Arch 18, as preferably constructed, is supported between the refractory lining of shell 12 and core 17. As thus constructed, the arch is capable of supporting large amounts of weight thereon at operating temperatures. The arch will support weights of 1000 p. s. i. and above at operating temperatures. The arch may be constructed of wedge shaped bricks which slope inwardly from top to bottom on each of their four lateral sides. These bricks may be formed together so as to make concentric self-supporting rings. Closure member 24 extends between the upper portion of core 17 and the refractory lining of shell 12 so as to close off annular pebble heating zone 22 below closure member 24 from pebble surge chamber 25 formed above closure member 24. Core 17 may be of such length as to extend from the bottom to the top of shell 12 and thereby make the surge chamber also annular, but it is preferably short enough to leave sufficient space between closure member 13 and its top so as to allow the introduction of pebbles into pebble surge chamber 25 through pebble conduit means, such as conduit 26, which is preferably centrally located in closure member 13. A plurality of pebble openings 27 is provided in closure member 24 so as to allow the passage of pebbles between pebble surge chamber 25 and pebble heating zone 22. The vertical alignment of openings 27 is preferably such that they are spaced between pebble outlets 23 in annular arch 18. Also provided in closure member 24 is a plurality of effluent outlet openings 28 which are preferably positioned between pebble openings 27 and are also preferably in substantially vertical alignment with pebble outlet openings 23 in annular arch 18. Effluent outlet conduits 29 communicate between openings 28 and an effluent disposal preferably on the exterior of shell 12. Closure member 24 will generally not be required to support the large amount of weight which is required of arch 18. It is, however, constructed so as to support those pebbles present in the pebble surge chamber and is so constructed as to wedge against the refractory lining of shell 12 on its outer periphery and against core 17 at its inner periphery. A plurality of pebble conduits 32 extend from points immediately below annular arch 18 into a gas heating chamber formed within shell 33. Conduits 32 extend upwardly through combustion chamber 19 to points substantially adjacent arch 18 and are positioned in substantially vertical alignment with pebble outlets 23 in annular arch 18. When the pebble heating chamber is raised to operating temperatures, arch 18 will be allowed to expand upwardly without fracturing conduits 32 inasmuch as no rigid connection is made therebetween. Pebble openings 23 may be provided at their lower ends with a lower lip which may form a slip joint with conduits 32 or, as shown in Figure 1, the opening may be unextended and maintained in vertical alignment with conduits 32 without any attachment therebetween. Heating means, such as burners 34, extend through the walls of shell 12 and are preferably tangentially directed into annular combustion chamber 19. It should be understood that burners 34 may be positioned perpendicularly to the combustion chamber and may be either vertically, obliquely or horizontally directed into the combustion chamber. Shell 33 is provided with an interior lining of materials such as common refractory materials 15 and super-refractory materials 16, which lining forms cylindrical gas heating chamber 35. The lining extends inwardly so that it covers the space below pebble outlets 23 and conduits 32. Cut out portions 36 are preferably provided in the refractory lining so as to allow the falling of pebbles from conduits 32 into cylindrical chamber 35. The floors of cut out portions 36 are spaced at such distance from conduits 32 as to allow the best flow of pebbles therefrom and maintain an equal pebble flow from each of the conduits 32. The best rate of flow will depend in each case upon the size of pebbles used. The bottom of cut out portions 36 is preferably horizontal. In that manner, pebbles are retained on the floor and are banked against the wall of the cut out portions and form a transient surface against which inflowing pebbles will come in contact. Second effluent outlet means, such as conduits 37, are provided in the upper portion of the gas heating chamber and extend between gas heating chamber 35 and an effluent disposal point. Due to the high temperature, effluent outlet conduit 37 is preferably made of or lined with a refractory material. Suitable insulation material 38 may be provided to insulate the top portion of the gas heating chamber. Beams 39 may be provided to support chamber 11 above the gas heating chamber. Outlet conduits 37 may be insulated and extended outwardly between beams 39.

In the operation of the device shown in Figure 1, pebbles are inserted into pebble surge chamber 25 through pebble inlet conduit 26. They pass downwardly through pebble openings 27 in closure member 24 and form an annular pebble bed on the top of annular arch 18. A covering of aggregate material may be provided over arch 18 in order to prevent the pebbles from passing through or clogging the perforations in arch 18. In the event that a covering of aggregate material is desired it may be desirable to provide projections upwardly around outlets 23 to retain the aggregate in the pebble heating zone. Combustible materials, together with an oxygen-containing gas, are passed through burners 34 and the combustible materials are burned therewith. The oxygen-containing gas is preferably provided in such an amount as to be in excess of that needed for the combustion of the combustible materials. The excess oxygen-containing gas may be used as a tempering agent to maintain the combustion gases at a predetermined temperature. The combustion gases, together with excess oxygen-containing gas, are passed upwardly through the perforations in arch 18 and through the pebble bed which is by this apparatus maintained at a relatively high ratio of depth to width. If carbonaceous or asphaltic deposits have collected on the pebble surfaces, the excess oxygen-containing gas will react with those deposits in an oxidation reaction which is exothermic and additional amounts of heat will be furnished to the pebbles thereby. Effluent gases are removed from the pebble heating zone through effluent outlet openings 28 and effluent outlet conduits 29. The heated pebbles are withdrawn from the pebble heating zone through the plurality of pebble outlets 23 in refractory arch 18 and pass downwardly through conduits 32 into pockets 36 where the pebbles fill the pockets to such a point as to form a semi-fluid surface on which the incoming pebbles will move. By regulating the distance from the opening 32 to the bottom of pockets 36, the rate of pebble flow may be substantially regulated. Gas heating chamber 35, like pebble heating zone 22, also has a relatively high ratio of depth to width. By providing pockets 36 to regulate pebble flow while sizing the upper portion of the gas heating chamber at substantially the same diameter as that of its intermediate walls the flow of pebbles may be regulated without substantially increasing the residence time of the reaction products in the reaction chamber. The gaseous effluent from the gas heating chamber is removed from the upper portion of the chamber by means of the second effluent outlet conduit 37.

In the device shown in Figure 3 of the drawings, pebble heating chamber 41 comprises a closed outer shell 42 which is closed at its top by closure member 43 and at its bottom by insulated member 44. Shell 42 is preferably provided with an interior insulation lining which lining may comprise common refractory material 15 and super-refractory material 16 backed by a common refractory 15 or some other suitable backing insulation material. The lower portion of shell 42 is enlarged so as to form combustion zone 45 therein. Combustion zone 45 is separated from the other space within shell 42 by wall 46 which is perforate. The perforations in wall 46 may preferably be formed in the shape of long slots between vertically extending columns, which columns support the insulation lining within shell 42. A portion of the bottom of combustion zone 45 is sloped inwardly which slope may continue into the space within wall 46. Core 47 extends substantially upwardly into the space within insulated shell 42, forming an annular pebble heating zone 48 therebetween. The base of core 47 may slope outwardly to direct pebbles, in conjunction with the sloping floor of combustion zone 45, to a relatively central circle on the floor of annular pebble heating zone 48. Pebble outlet conduits 49 are provided in the floor of pebble heating chamber 41 so as to communicate between annular pebble heating zone 48 and a gas heating chamber similar to that described in Figure 1 of the drawings. Closure member 50 preferably extends between the upper portion of core 47 and the refractory lining of shell 42 and is supported thereby. Closure member 50 closes the top of annular pebble heating zone 48 and forms pebble surge chamber 51 thereabove. Pebble openings 52 are provided in closure member 50 and are adapted so as to allow the passage of pebbles between surge chamber 51 and heating chamber 48. Pebble openings 52 are preferably disposed about the closure member adjacent its outer periphery. Effluent outlet openings 53 are also provided in closure member 50 and are preferably positioned about closure member 50 at points intermediate pebble openings 52 but adjacent the inner periphery of closure member 50. Effluent outlet means, such as conduits 54, extend between effluent outlet openings 53 and an effluent disposal, preferably on the exterior of shell 42. Pebble inlet means, such as conduit 55, is provided in the upper portion of chamber 41, preferably in closure member 43. Core 47 may be of such length as to extend entirely from the bottom of chamber 41 to closure member 43. It is preferred, however, that such core be short enough to allow the positioning of pebble inlet conduit 55 substantially centrally in closure member 43 and the insertion of pebbles therethrough into pebble surge chamber 51. Core 47 is considerably smaller in outer diameter than the interior diameter of insulation lined shell 42. Heating means, such as burners 56, extend through shell 42 and preferably tangentially into combustion chamber 45. Burners 56 may be adapted in any position so as to supply combustible materials to combustion zone 45 and burn those materials therein.

The operation of the device shown in Figure 3 is similar to that shown in Figure 1. Pebbles are inserted into pebble surge chamber 51 through pebble inlet conduit 55 and pass downwardly into pebble heating zone 48 through pebble openings 52 in closure member 50. By positioning pebble openings 52 adjacent the outer periphery of closure member 50, the top of the pebble bed formed within heating zone 48 slopes inwardly and downwardly from pebble openings 52 to the face of core 47. Combustible materials, together with an oxygen-containing gas which is preferably in excess of that necessary for the combustion of the combustible materials, are injected into combustion zone 45 through burners 56 and are burned therein. The excess oxygen-containing gas tempers the combustion gases maintaining them at a predetermined temperature. The combustion gas passes through the perforations or slots in wall 46 and pass inwardly and upwardly through the pebble bed and out the pebble heating zone through effluent outlet openings 53 and conduits 54. By this method of passing hot heat exchange gas through the pebble bed the gas passes through and substantially across the entire bed causing substantially all of the moving pebbles to pass through the gas flow. Pebbles are withdrawn from the pebble heating zone 48 through pebble outlet conduits 49 and may be passed into a gas heating chamber below the pebble heating chamber in substantially the same manner as that described in the description of Figure 1.

In the apparatus schematically shown in Figure 5 of the drawings, pebbles are inserted into pebble heating chamber 11 through pebble inlet 26 and are passed contiguously downwardly therethrough into the gas heating chamber contained within shell 33. Combustible materials are introduced into the pebble heating chamber 11 through burners 34 wherein the combustible materials are burned in the presence of oxygen-containing gas and the hot gases are passed upwardly through the pebble bed and are removed through effluent outlet conduits 29. Reaction materials are introduced into the gas heating chamber within shell 33 through gaseous reactant material inlet conduits 60. The gaseous reactant materials pass upwardly through the pebble bed and are removed therefrom through the second effluent outlet conduits 37. Pebbles are removed from the bottom of the gas heating chamber and are transferred therefrom to the top of pebble heating chamber 11 by elevating means, such as elevator 61.

In some instances, combustion gas may escape or be carried from the pebble heating chamber into the gas heating chamber or effluent materials from the gas heating chamber may escape upwardly into the pebble heating chamber through the pebble conduits therebetween. If such a situation occurs, conduit attachments may be provided in the pebble conduits so as to inject steam or some other gas which is inert to the reactions into the conduits so as to form a choke therein preventing the passage of other gases back and forth between pebble heating and gas heating chambers.

It has been determined by experiment that at least a certain minimum pebble bed depth should be maintained above a constricted outlet in order to obtain a zone of even pebble flow. That distance is approximately 1.5 times the diameter of the chamber served by the outlet. This has been verified by determining that the angle of slip, which is the term applied to the angle taken from a horizontal line passing through the inlet to the pebble outlet, beneath which the pebbles are substantially stagnant and above which pebbles are substantially all flowing, is approximately 70°. This angle intersects a cylindrical chamber about a centrally located outlet at a point about 1.4 times the diameter of the chamber above the level of the pebble outlet.

In order to obtain the most uniform heating, it is desirable to have the smallest possible ratio of the height of the stagnant pebble bed to the height of uniformly flowing pebble bed. This cannot be satisfactorily accomplished by merely increasing the total depth of the pebble bed because the pressure drop of the gas flowing through the pebble bed increases directly with the pebble depth. In many cases an increase of only a few pounds pressure drop would require the installation of additional or more efficient blower equipment.

By establishing a plurality of pebble beds, whether each bed is totally encompassed by walls or not, the ratio of stagnant pebble bed to uniformly flowing pebble bed may be decreased without increasing the depth of the pebble bed. It is desirable to keep the distance, from center to center of the outlets, shorter than the radial thickness of the annulus. Such positioning of the outlets causes the depth of the stagnant pebbles to be limited by the annulus rather than the distance between the outlets. The number of outlets which should be used is dependent upon the proportionate diameter of the core to that of the chamber. In cases when the core is ¼ the diameter of the chamber, six or seven outlets are preferred. When the core diameter is ⅓ that of the chamber diameter it is preferred to use seven or eight outlets. Though core diameters of between ¼ and ⅓ the diameter of the chamber are preferred other core diameters may be used.

The size of the pebbles is also a determining factor in the size of the pebble outlet. Best pebble flow is secured through outlets which have diameters at least seven or eight times the diameter of the pebbles. When circulating ⅜ inch diameter alumina pebbles at a rate of 27 tons per hour it is desirable, when using a single pebble outlet, that the outlet have a diameter of at least seven inches. When multiple outlets are used the minimum desirable outlet diameter is at least three inches.

*Specific example*

A pebble heater chamber which is 7.5 feet in inner diameter is provided in its top section with a centrally located single pebble inlet. A pebble outlet which is 7 inches in diameter is centrally located in the bottom section of the chamber. Alumina pebbles which are about ⅜ inch in diameter are fed into the chamber through the pebble inlet so as to form a pebble bed therein. The pebbles are then withdrawn from the pebble outlet as additional pebbles are inserted through the inlet. In this manner, a contiguous flowing pebble bed is formed through the length of the chamber. A stagnant or still area is formed in the bottom of the chamber and extends upwardly from the pebble outlet at an angle of approximately 70° from the horizontal. The depth of the stagnant area measured at the periphery of the bed and from a horizontal passed through the inlet point of the pebble outlet is 10.3 feet.

A pebble heater chamber which is also 7.5 feet in inner diameter is provided with a central core having an outer diameter of 1.87 feet. Five pebble outlets which are 3 inches in diameter are equally spaced about a ring centrally located on the floor of the annular chamber formed between the core and the outer chamber. Alumina pebbles which are about ⅜ inch in diameter are inserted into the chamber through pebble inlet means in the top of the chamber. Once a bed of pebbles has been obtained in the annular chamber pebbles are withdrawn from the pebble outlets as pebbles are inserted through the pebble inlets. Stagnant areas are formed on the floor of the annular chamber, surrounding the pebble outlets. The depth of the stagnant area taken at the peripheries of the funnels formed about the outlet and taken from a horizontal passing through the inlets to the outlets is 4.5 feet.

Comparison of the above two specific examples will disclose the fact that the use of the core and plurality of outlets results in a decrease in stagnant bed depth and an increase in moving bed depth of 5.8 feet.

Advantages of this invention are illustrated by the above examples. The sizes and proportions are presented as being typical and should not be construed to limit the invention unduly.

The shape of the chamber and core is not necessarily to be limited to cylinders. Any desired cross-sectional shape may be utilized while maintaining the chamber in a substantially vertical position. Neither is it necessary to integrate the chambers into a single unitary structure as has been shown in the preferred embodiments of the invention. The pebble heating chamber may be supported separate from the gas heating chamber and supply any desired amount of space therebetween while establishing communication between the two chambers by pebble conduits. In a like manner, a pebble surge chamber may be established as a separate shell or structure connected only by communicating pebble conduits.

As will be evident to those skilled in the art, various modifications of this invention can be made or followed in the light of the foregoing disclosure, discussion and example without departing from the spirit or scope of the disclosure or from the scope of the claims.

I claim:

1. In pebble heater apparatus utilizing a moving bed of pebbles, an improved pebble heater chamber comprising an upright closed outer shell; a closed core, considerably smaller in cross-section than said shell, extending substantially coaxially upwardly into said shell from its bottom, forming a pebble heating zone therebetween; a plurality of pebble outlets extending downwardly from said pebble heating zone through the bottom of said closed shell; heating means in the lower portion of said shell and adapted so as to supply hot gas to the lower portion of said pebble heating zone; pebble inlet means centrally disposed in the upper portion of said shell and above said closed core; and effluent outlet means in the upper portion of said shell extending between said pebble heating zone and exterior of said shell.

2. In pebble heater apparatus utilizing a moving bed of pebbles, an improved pebble heater chamber comprising a substantially vertically disposed closed outer shell; a closed core, shorter and considerably smaller in diameter than said shell, extending substantially coaxially upwardly into said shell from its bottom, forming an annular pebble heating zone therebetween; a plurality of pebble outlets extending downwardly from said annular pebble heating zone through the bottom of said closed shell; heating means in the lower portion of said shell and adapted so as to supply hot gas to the lower portion of said annular pebble heating zone; a closure member extending between the upper portion of said core and said outer shell and closing said annular space therebetween; a plurality of pebble conduits in said closure adapted so as to convey pebbles between the upper side of said closure and said annular pebble heating zone; a plurality of effluent outlet openings in said closure being adapted so as to convey effluent upwardly from said annular pebble heating zone; effluent outlet means extending between said effluent outlet openings and the exterior of said shell; and pebble inlet means in said shell above said closure member.

3. In pebble heater apparatus utilizing a moving bed of pebbles, an improved pebble heater chamber comprising a closed interiorly insulated outer shell; a closed core, considerably smaller in diameter than said shell, extending substantially coaxially upwardly into said shell from its bottom, forming an annular pebble heating zone therebetween; a perforate load-supporting arch encircling said core and extending between said insulated shell and said core so as to form a combustion zone below said arch; a plurality of pebble outlets in said arch; a plurality of pebble conduits extending upwardly through the bottom of said pebble heater chamber into said combustion zone to points substantially adjacent said arch, said conduits being disposed in vertical alignment with said pebble outlets so as to convey pebbles passing through said arch to a point below said chamber; heating means extending through the side of said shell into said combustion zone adapted so as to supply to and burn combustible materials in said combustion zone; pebble inlet means in the upper portion of said shell; and effluent outlet means communicating between the upper portion of said pebble heating zone and the exterior of said shell.

4. The pebble heating chamber of claim 3, wherein the upper portion of said annular pebble heating zone is closed by a closure member so as to form a pebble surge chamber above said closure; a plurality of pebble openings in said closure being adapted so as to allow the passage of pebbles between said surge chamber and said pebble heating zone.

5. The pebble heating chamber of claim 3, wherein the upper portion of said annular pebble heating zone is closed by a closure member so as to form a pebble surge chamber above said closure; a plurality of pebble openings in said closure extending between said surge chamber and said pebble heating zone; and a plurality of effluent outlet openings in said closure forming sections of said effluent outlet means.

6. The pebble heating chamber of claim 3, wherein said heating means comprises a plurality of tangentially positioned burners.

7. In pebble heater apparatus utilizing a moving bed of pebbles, an improved pebble heater chamber comprising a closed interiorly insulated outer shell; a closed core, shorter and considerably smaller in diameter than said shell, extending substantially coaxially upwardly into said shell from its bottom, forming an annular pebble heating zone therebetween; a load-supporting arch encircling said core and extending between said insulated shell and said core so as to form a combustion zone below said arch; a plurality of pebble outlets in said arch; a plurality of pebble conduits extending upwardly through the bottom of said pebble heater chamber into said combustion zone to points substantially adjacent said arch, said conduits being disposed in vertical alignment with said pebble outlets so as to convey pebbles passing through said arch to a point below said chamber; a plurality of burners extending through said insulated shell tangentially into said combustion zone; a closure member extending between the upper portion of said core and said outer shell closing the top of said annular pebble heating zone to form a pebble surge chamber thereabove; pebble inlet means in said shell above said closure member; a plurality of pebble openings in said closure member communicating between said surge chamber and said annular pebble heating zone, said pebble openings being out of vertical alignment with said pebble outlets in said load-supporting arch; a plurality of effluent outlet openings in said closure; and a plurality of effluent outlet conduits communicating between said effluent outlet openings and an effluent disposal.

8. The pebble heater apparatus of claim 7, wherein said plurality of effluent outlet openings are in vertical alignment with said pebble outlets in said load-supporting arch.

9. In pebble heater apparatus utilizing a moving bed of pebbles, an improved pebble heater chamber comprising an upright closed outer shell, said shell being enlarged in its lower portion so as to form a combustion zone in said enlarged portion; a closed core, considerably smaller in diameter than said shell, extending substantially coaxially upwardly into said shell from its bottom, forming an annular pebble heating zone therebetween; a plurality of pebble conduits extending through the bottom of said closed shell communicating between said annular pebble heating zone and points below said chamber; heating means extending through the side of said shell into said combustion zone; pebble inlet means centrally disposed in the upper portion of said shell and above said closed core; and effluent outlet means communicating between the upper portion of said pebble heating zone and the exterior of said shell.

10. In pebble heater apparatus utilizing a moving bed of pebbles, an improved pebble heater chamber comprising a substantially vertically disposed interiorly insulated closed outer shell, said shell being enlarged in its lower portion so as to form a combustion zone in said enlarged portion; a perforate wall separating said combustion zone from the remaining space within said shell; a closed core, considerably smaller in diameter than said shell, extending substantially coaxially upwardly into said shell from its bottom, forming an annular pebble heating zone therebetween; a plurality of pebble conduits extending through the bottom of said closed shell communicating between said annular pebble heating zone and points below said chamber; heating means extending through the side of said shell into said combustion zone; a closure member extending between the upper portion of said core and said outer shell so as to form a pebble surge chamber within the upper portion of said shell; a plurality of pebble openings in said closure adapted so as to convey pebbles between said pebble surge chamber and said annular pebble heating zone; a plurality of effluent outlet openings in said closure being adapted so as to convey effluent upwardly from said annular pebble heating zone; effluent outlet means extending between said effluent outlet openings and the exterior of said shell; and pebble inlet means in said shell above said closure member.

11. The pebble heater chamber of claim 10, wherein said plurality of pebble openings are disposed about said closure adjacent its outer periphery.

12. The pebble heater chamber of claim 11, wherein said plurality of effluent outlet openings are disposed about said closure adjacent its inner periphery.

13. The pebble heating chamber of claim 10, wherein said heating means comprises a plurality of tangentially positioned burners.

ROBERT R. GOINS.

REFERENCES CITED

The following references are of record in the file of this patent:

UNITED STATES PATENTS

| Number | Name | Date |
|---|---|---|
| 2,398,954 | Odell | Apr. 23, 1946 |
| 2,399,450 | Ramseyer | Apr. 30, 1946 |
| 2,445,554 | Bergstrom | July 20, 1948 |
| 2,446,805 | Bergstrom | Aug. 10, 1948 |

OTHER REFERENCES

Page 246 of Trinks, Industrial Furnaces, vol. II, second edition, copyright 1942. Published by John Wiley and Sons, New York, N. Y.